United States Patent
Weiner et al.

(10) Patent No.: US 6,696,004 B1
(45) Date of Patent: Feb. 24, 2004

(54) PROCESS FOR MANUFACTURING AN IMBEDDED VINYL FLOORING PRODUCT

(75) Inventors: Robert S. Weiner, Atlanta, GA (US); John W. Waller, Ringgold, GA (US); Willard Clifton Owens, Chatsworth, GA (US)

(73) Assignee: Product Concepts Residential, L.L.C., Dalton, GA (US)

( * ) Notice: Subject to any disclaimer, the term of this patent is extended or adjusted under 35 U.S.C. 154(b) by 0 days.

(21) Appl. No.: 10/125,290

(22) Filed: Apr. 18, 2002

(51) Int. Cl.⁷ .............................................. B29C 41/20
(52) U.S. Cl. ................... 264/257; 264/266; 264/271.1; 264/279.1; 264/299; 264/319
(58) Field of Search ................................. 264/257, 258, 264/266, 271.1, 279.1, 299, 319, 324

(56) References Cited

U.S. PATENT DOCUMENTS

| | | | | |
|---|---|---|---|---|
| 4,579,658 A | * | 4/1986 | Moller ........................ | 210/483 |
| 4,689,258 A | * | 8/1987 | Slosberg et al. ............. | 428/141 |
| 5,695,696 A | * | 12/1997 | Hensler et al. .............. | 264/21 |
| 5,714,229 A | * | 2/1998 | Ogden ......................... | 428/138 |
| 5,744,209 A | * | 4/1998 | Parkes ........................ | 428/96 |
| 6,210,620 B1 | * | 4/2001 | Wilke ......................... | 264/257 |
| 6,221,298 B1 | * | 4/2001 | Ferreira et al. ............. | 264/243 |

* cited by examiner

*Primary Examiner*—Stefan Staicovici
(74) *Attorney, Agent, or Firm*—Stephen J. Stark; Miller & Martin LLP

(57) ABSTRACT

A process is provided for manufacturing an imbedded flooring product having a skeletal frame in the form of a mesh at least partially imbedded into a vinyl sheet substrate. The method provides for the mesh to create a pattern visible from above the sheet.

10 Claims, 2 Drawing Sheets

PROCESS FOR MANUFACTURING AN IMBEDDED VINYL FLOORING PRODUCT

BACKGROUND OF THE INVENTION

The present invention relates to a vinyl flooring product having a design visible from a top surface of the product, and more particularly to a vinyl flooring product having an imbedded web creating a pattern visible from above.

Vinyl is often applied to the back of carpet tile. Vinyl is also utilized to create flooring products. Textures have been added to the surface of some vinyl flooring products as described in U.S. Pat. No. 4,379,185. However, a need still exists to provide an improved flooring product, especially one with superior aesthetics.

SUMMARY OF THE INVENTION

Consequently, it is an object of the present invention to provide a vinyl flooring product having improved aesthetics, and particularly such a product which utilizing a mesh, screen or scrim, hereafter a skeletal framework, which is imbedded into a top surface of the vinyl and then cured in an oven. The finished product produces a pattern which has a top portion of the skeletal framework exposed through a top surface of the cured vinyl or has valleys in a top surface of the vinyl where the mesh has been imbedded which resembles the skeletal framework.

Vinyl at least partially fills the voids, or openings, between runners in the skeletal framework. Anticipated skeletal framework material include metal and nylon. Further processing may be performed on the imbedded vinyl including, but not limited to, cutting into squares, and/or coating with a clear protective coating.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
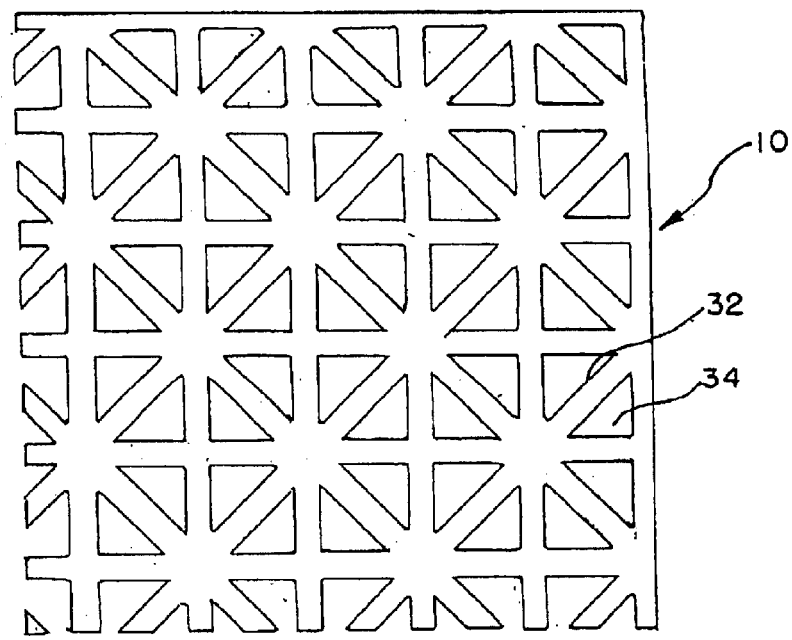
FIG. 1 is a top elevational view of a skeletal framework in the form of a mesh utilized in the present invention.
Figure 4:
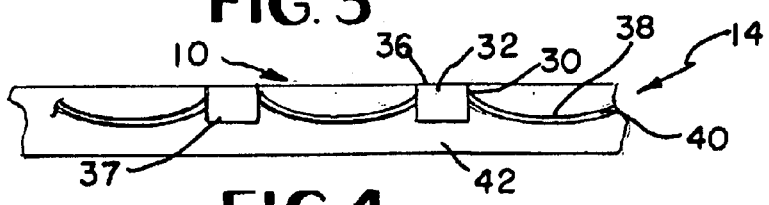
FIG. 4 is a cross sectional view of the second embodiment of FIG. 3.

FIG. 1 shows a skeletal framework in the form of a mesh 10 for use in imbedding into a vinyl substrate. The mesh 10 has limbs or runners 32 which circumscribe openings 34. The runners 32 meet at one or more junctures 35,37. The runners 32 have top surfaces 36 and bottom surfaces 37 as shown in FIG. 4. While FIG. 1 shows one design of a metal skeletal framework in the form of a mesh, or screen, many other designs could be utilized including those with round openings, square openings, or other shaped openings. Furthermore, all openings 34 need not be identically shaped in a particular mesh. The mesh 10 could also be nylon or other appropriate material.

Figure 2:
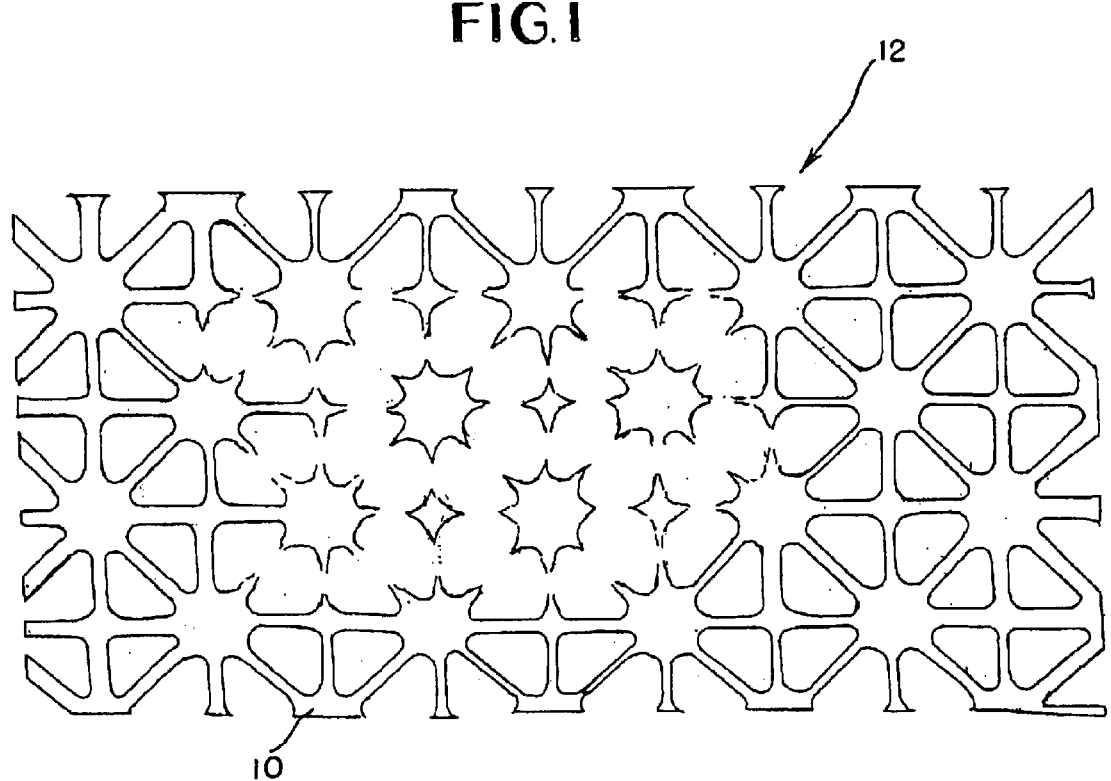
FIG. 2 is a top elevational view of a first embodiment of the mesh imbedded vinyl product of the present invention utilizing the mesh of FIG. 1.
Figure 3:
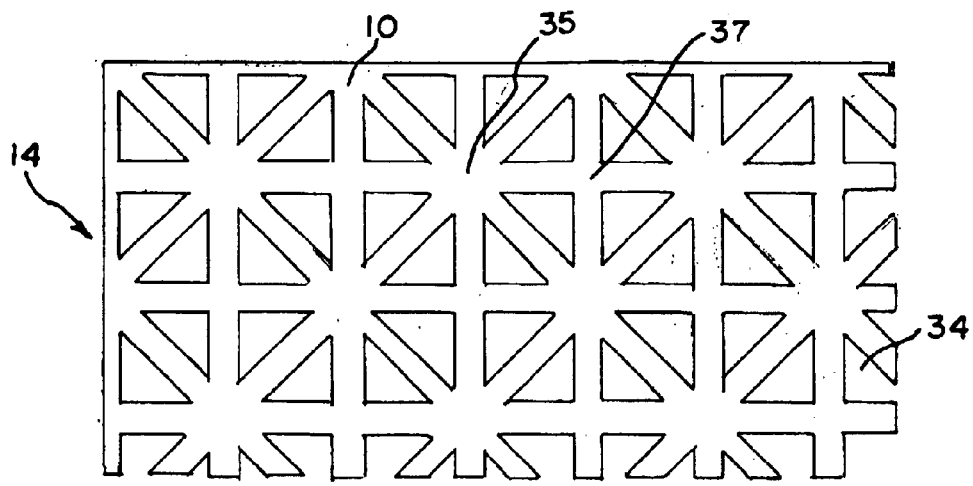
FIG. 3 is a top elevational plan view of a second embodiment of the present invention utilizing the mesh of FIG. 1.
Figure 5:
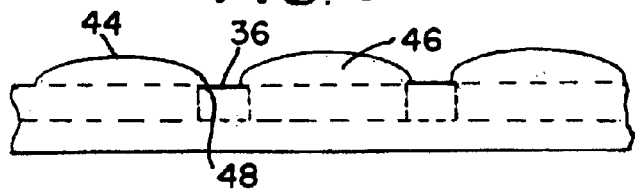
FIG. 5 is a cross-sectional view of a first portion of the first embodiment of FIG. 2.
Figure 6:
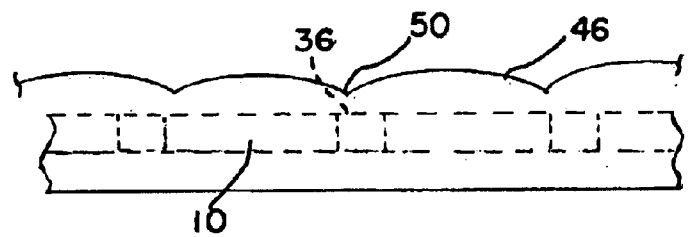
FIG. 6 is a cross-sectional view of a second portion of the first embodiment of FIG. 2.

FIGS. 2 and 3 show the mesh 10 installed in vinyl flooring products 12,14. FIGS. 4–6 show cross sectional portions of FIGS. 2 and 3 at various locations.

Vinyl is often utilized to back carpet tile. Vinyl forms a relatively thin layer which is adhered to a back side of carpet to form tile. The thin layer is usually formed by pouring liquid vinyl onto a conveyor belt which is then transported through an oven to cure as a sheet of vinyl or the back of a tufted carpet.

Figure 7:
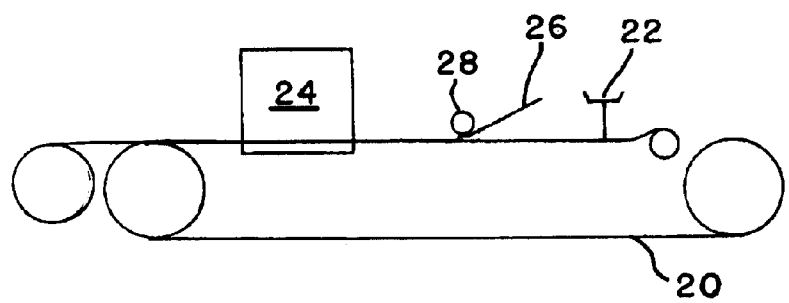
FIG. 7 is a diagrammatic view of a process of making the mesh imbedded vinyl of FIGS. 2 and 3.

FIG. 7 shows a diagram of a method of imbedding a mesh into a vinyl substrate. A conveyor 20 is utilized to transport a film of liquid vinyl provided from the supply 22. Before entering the oven 24 to cure into a solid form, a mesh 26 is placed on a top surface of the liquid vinyl. Imbedders, such as rollers 28, may be utilized to selectively adjust the depth of the mesh 26 relative to the top surface exposed vinyl portions during the imbedding process. The various designs produced will be explained in more detail below depending upon the depth and contour, such as provided by multi-depths. The composite unit is then transported by conveyor 20 into the oven 24 and cured. Curing at 250–275 degrees Fahrenheit has been found to adequately cure the liquid vinyl into a solid vinyl sheet as it passes through the oven 24. After leaving the oven 24, the composite product with the vinyl cured, and at least mechanically connected to the mesh 26, may then be further processed, such as by rolling into rolls, cutting into tiles, adding additional layers or colors, etc. . .

The depth at which the mesh 10 is imbedded into the liquid vinyl has a large influence on the design of the flooring product after curing in the oven 24. FIGS. 3 and 4 represent a first product 14 and a cross sectional portion of the first product 14 respectively.

The first product 14 enters the oven 24 with the mesh 10 only slightly depressed into the liquid vinyl. The bottom surface 37 of the runners 32 is below the top surface 44 of the vinyl. The vinyl forms a vinyl bottom layer 42 which forms a non-porous sheet surface which extends below the mesh 10. Slight wicking of vinyl may be observed on walls 30 of runners 32 of the first mesh 10 within the openings 34 between runners 32. The first product 14 may have vinyl which wicks up toward a top surface 36 of the first mesh 10 and forms a bubble 38, or well, within the openings 34. The top surface 36 of the first mesh 10 is not obscured from view by cured vinyl 40. A bottom vinyl layer 42 extends below the bubbles 38, or wells, and first mesh 10. It is possible that the bubbles 38 may extend above the top surface 36 of the mesh, but they do not overhang to obscure the first mesh 10 from view in this embodiment. In other embodiments, overhanging occurs.

A second vinyl product 12 is shown in FIGS. 2, 5 and 6. The second product 12 is constructed in a similar manner as the first product 14, except that the imbedder 28 places the mesh at a greater depth than is done in the first product 14. In the second product 12, the vinyl extends through the openings 34 and extends over at least some of the top surface 36 of the first mesh 10 as an overhang. FIG. 5 shows a cross section of second product 12 such as taken along the left side of FIG. 2, while FIG. 6 shows a cross section of product taken along the middle of FIG. 2.

In FIG. 5, the top surface 44 extends above the top surface 36 of the first mesh 10, however at least a portion of the top surface 36 is still visible. The bubble 46 with the top surface 44 may, or may not, have an overhang 48 which extends over a portion of the top surface 36 of the mesh. This creates the look illustrated in FIG. 2 at the left side of that Figure. If more pressure is applied during the imbedding process, and/or if the first mesh 10 is applied at a deeper depth, then the product of FIG. 6 and certain portions of the center of FIG. 2 may be created.

In FIG. 6, the bubbles 46 once again extend above the top surface 36 of the first mesh 10. However, in this embodiment, the top surface 36 of the first mesh 10 is no longer visible. Nevertheless, valleys 50 are created between the bubbles 46 where the first mesh 10 has been imbedded into the vinyl. Both embodiments of FIGS. 5 and 6 have vinyl throughout the openings 34 intermediate the runners 32.

At the center of FIG. 2, due to the change in thickness of where the runners 32 meet relative to the arms 32 themselves, parts of the cross section would resemble FIG. 5, while parts would resemble FIG. 6. This also creates a possible design choice. With other mesh designs, other designs can be created. Additionally, the depth of imbedding the mesh 10 may vary across different portions of the flooring product to create still further design choices.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of continuosly producing a flooring product comprising:

providing liquid vinyl in a first layer having a top surface;

selectively imbedding a skeletal frame in the form of a mesh having runners, openings between the runners, and a top surface and a bottom surface, into the top surface of the liquid vinyl at a predetermined depth so that the bottom surface of the mesh extends a distance below the top surface of the top surface of the liquid vinyl and a pattern is created between the top surface of the vinyl and the skeletal frame with said vinyl extending continuously along the openings above the bottom surface of the mesh; and curing the vinyl with the mesh imbedded in the vinyl to solidify the vinyl wherein at least a portion of said pattern remains exposed to view from above, and said top surface of said vinyl comprises at least two elevations relative to the bottom surface.

2. The method of claim 1 further comprising the step of allowing the liquid vinyl to cure wherein the top surface of the vinyl extends through the openings and above the top surface of the mesh.

3. The method of claim 1 wherein the mesh has a top surface and wherein the step of imbedding the mesh further comprises embedding the mesh near the top surface of the mesh is proximate to the top surface of the liquid vinyl.

4. The method of claim 1 wherein the step of curing the vinyl further comprises allowing the vinyl to expand such that bubbles are formed during the curing process.

5. The method of claim 4 wherein the bubbles are formed within the openings.

6. The method of claim 4 wherein the top surface of the bubbles extends proximate to the top surface of the mesh during the curing process.

7. The method of claim 6 wherein the top surface of the bubbles extends a distance above the top surface of the mesh without completely covering the top surface of the mesh.

8. The method of claim 6 wherein the bubbles completely overhang the top surface of the mesh during the curing process forming valleys between adjacent bubbles on top of the top portions of the mesh.

9. The method of claim 1 wherein the liquid vinyl has a second layer and during the step of curing the vinyl, said second layer forms a non-porous sheet below the first layer and mesh.

10. The method of claim 1 wherein the step of imbedding the mesh further comprises imbedding the mesh at multiple depths.

* * * * *